(12) United States Patent
Castelaz et al.

(10) Patent No.: US 11,882,446 B1
(45) Date of Patent: Jan. 23, 2024

(54) VEHICLE CHARGE STATION NETWORK ACCESS CREDENTIAL UPDATING SYSTEM

(71) Applicant: Motiv Power Systems, Inc., Foster City, CA (US)

(72) Inventors: James Michael Castelaz, Alameda, CA (US); Joseph O. DeAngelo, Winters, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 361 days.

(21) Appl. No.: 17/383,343

(22) Filed: Jul. 22, 2021

Related U.S. Application Data

(60) Provisional application No. 63/054,795, filed on Jul. 22, 2020.

(51) Int. Cl.
*H04W 12/069* (2021.01)
*G06F 9/54* (2006.01)

(52) U.S. Cl.
CPC .......... *H04W 12/069* (2021.01); *G06F 9/547* (2013.01)

(58) Field of Classification Search
CPC ..... H04W 12/069; H04W 12/06; H04W 4/44; H04W 4/40; H04W 12/03; H04W 4/46; H04W 12/041; H04W 12/0431; H04W 12/068; G06F 9/547; G06Q 20/3829
See application file for complete search history.

(56) References Cited

U.S. PATENT DOCUMENTS

| | | | |
|---|---|---|---|
| 8,565,950 B2* | 10/2013 | Ishibashi | H04L 9/3273 701/29.6 |
| 11,196,560 B2* | 12/2021 | Chengalvala | H04L 63/20 |
| 2013/0160086 A1* | 6/2013 | Katar | H04L 63/08 726/4 |
| 2017/0182902 A1* | 6/2017 | Katayama | H02J 7/00 |
| 2019/0141023 A1* | 5/2019 | Miramonti | H04L 41/0806 |

* cited by examiner

*Primary Examiner* — Ali S Abyaneh
(74) *Attorney, Agent, or Firm* — Adibi IP Group, PC; Amir V. Adibi; Andrew C. Palmer

(57) ABSTRACT

A network access credential change request is received onto a network access credential updating system. The network access credential change request is a request to update access credentials of a network near a vehicle charge station. The new credential in the request is communicated to an electric vehicle. The network is updated with the network access credential. The vehicle is able to connect to the network with the updated credential after the network has been updated. In one embodiment, the network access credential updating system includes an application. A charge station operating entity communicates a network access credential change request for a particular network to the application. After sending the request, the charge station operating entity updates the network access credential for the network in accordance with a credential update agreement. The credential update agreement tends to afford adequate opportunity for vehicles to receive updated credentials before networks are updated.

19 Claims, 13 Drawing Sheets

VEHICLE DATA MANAGEMENT SYSTEM

CREDENTIALS UPDATED IN ACCORDANCE WITH CREDENTIAL UPDATE AGREEMENT

VEHICLE WITH NETWORK ACCESS POINT

USING VEHICLE NETWORK ACCESS POINT AS NETWORK GATEWAY

VEHICLE CHARGE STATION NETWORK ACCESS CREDENTIAL UPDATING SYSTEM

CROSS REFERENCE TO RELATED APPLICATIONS

This application claims the benefit under 35 U.S.C. § 119 from U.S. Provisional Patent Application No. 63/054,795, entitled "Vehicle Charge Station Network Access Credential Updating System," filed on Jul. 22, 2020, the subject matter of which is expressly incorporated herein by reference.

TECHNICAL FIELD

The present disclosure relates generally to vehicle charge stations, and more specifically to systems and methods of accessing networks at vehicle charge stations.

BACKGROUND INFORMATION

An electric vehicle typically includes energy storage systems that store electrical energy, such as battery packs. Power circuitry within the electric vehicle uses energy stored in the battery packs to drive an electric motor of the electric vehicle. After the energy stored in the battery packs has been depleted, the battery packs must be charged. An electric vehicle charge station, also referred to as "electric vehicle service equipment" or "EVSE," couples the power circuitry of the electric vehicle to an Alternating Current (AC) power source to charge the battery packs.

During charging, it is often desirable for the electric vehicle to connect to a network. Connecting to a network allows the electric vehicle to communicate data collected during operation, such as battery state of charge or diagnostic data, and to receive software updates. For security and bandwidth reasons, many network access points require valid credentials to connect. It is desirable to store valid credentials for network access points so that vehicles can access networks while charging. It is desirable to change network access credentials over time for network security.

SUMMARY

A network access credential change request is received onto a network access credential updating system. The network access credential change request is a request to update access credentials of a network near a vehicle charge station. The new network access credential in the request is communicated to an electric vehicle. The network is updated with the new network access credential. The vehicle is able to connect to the network with the updated credential after the network has been updated. In one embodiment, the network access credential updating system includes an application. A charge station operating entity communicates a network access credential change request for a particular network to the application. After sending the request, the charge station operating entity updates the network access credential for the network in accordance with a credential update agreement. The credential update agreement may afford adequate opportunity for vehicles to receive updated credentials before networks are updated.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

Although certain specific embodiments are described above for instructional purposes, the teachings of this patent document have general applicability and are not limited to the specific embodiments described above.

DETAILED DESCRIPTION

Reference will now be made in detail to some embodiments of the invention, examples of which are illustrated in the accompanying drawings.

Figure 1:
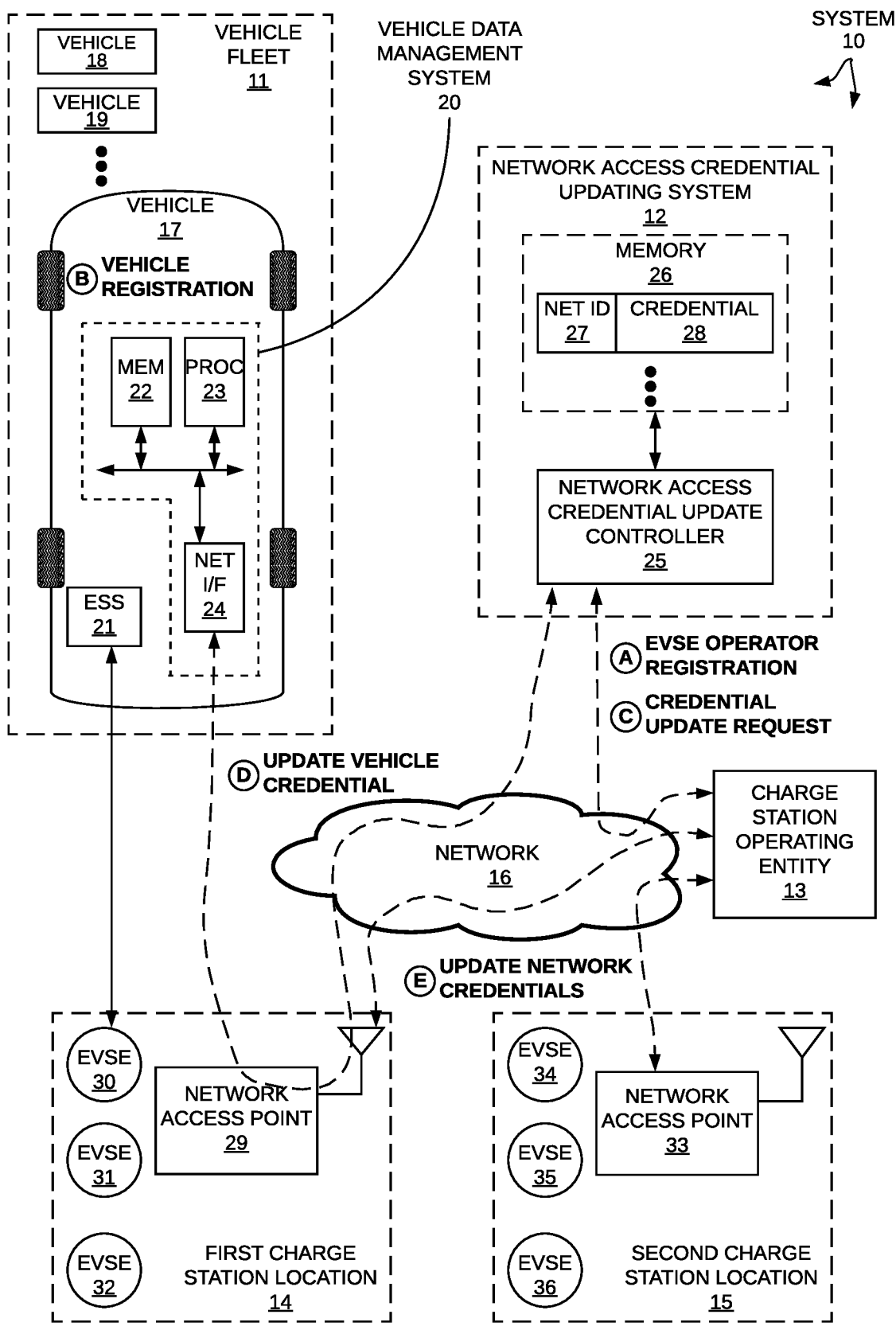
FIG. 1 is a high level diagram of a system 10.

FIG. 1 is a high level diagram of a system 10. System 10 comprises a vehicle fleet 11, a network access credential updating system 12, a charge station operating entity 13, a first charge station location 14, a second charge station location 15, and a network 16. The vehicle fleet 11 includes one or more vehicles that are to connect to the network 16. In this example, the vehicle fleet 11 includes a vehicle 17, vehicle 18, and a vehicle 19.

Vehicle 17 includes a vehicle data management system 20 and an energy storage system (ESS) 21. The vehicle data management system 20 comprises a memory 22, a processor 23, and a network interface 24. The memory 22, the processor 23, and the network interface 24 communicate over a data bus.

The network access credential updating system 12 comprises a network access credential update controller 25 and a memory 26. The memory 26 stores network identification information 27 and network access credential information 28 for each respective network.

The charge station operating entity 13 operates various charger station locations, some of which are equipped with network access points. These network access points may involve wired or wireless access to network 16. In this example, the charge station operating entity 13 operates two charge station locations 14 and 15. The first charge station location 14 comprises a network access point 29, an EVSE 30, an EVSE 31, and an EVSE 32. The second charge station location 15 comprises a network access point 33, an EVSE 34, an EVSE 35, and an EVSE 36.

Figure 2:
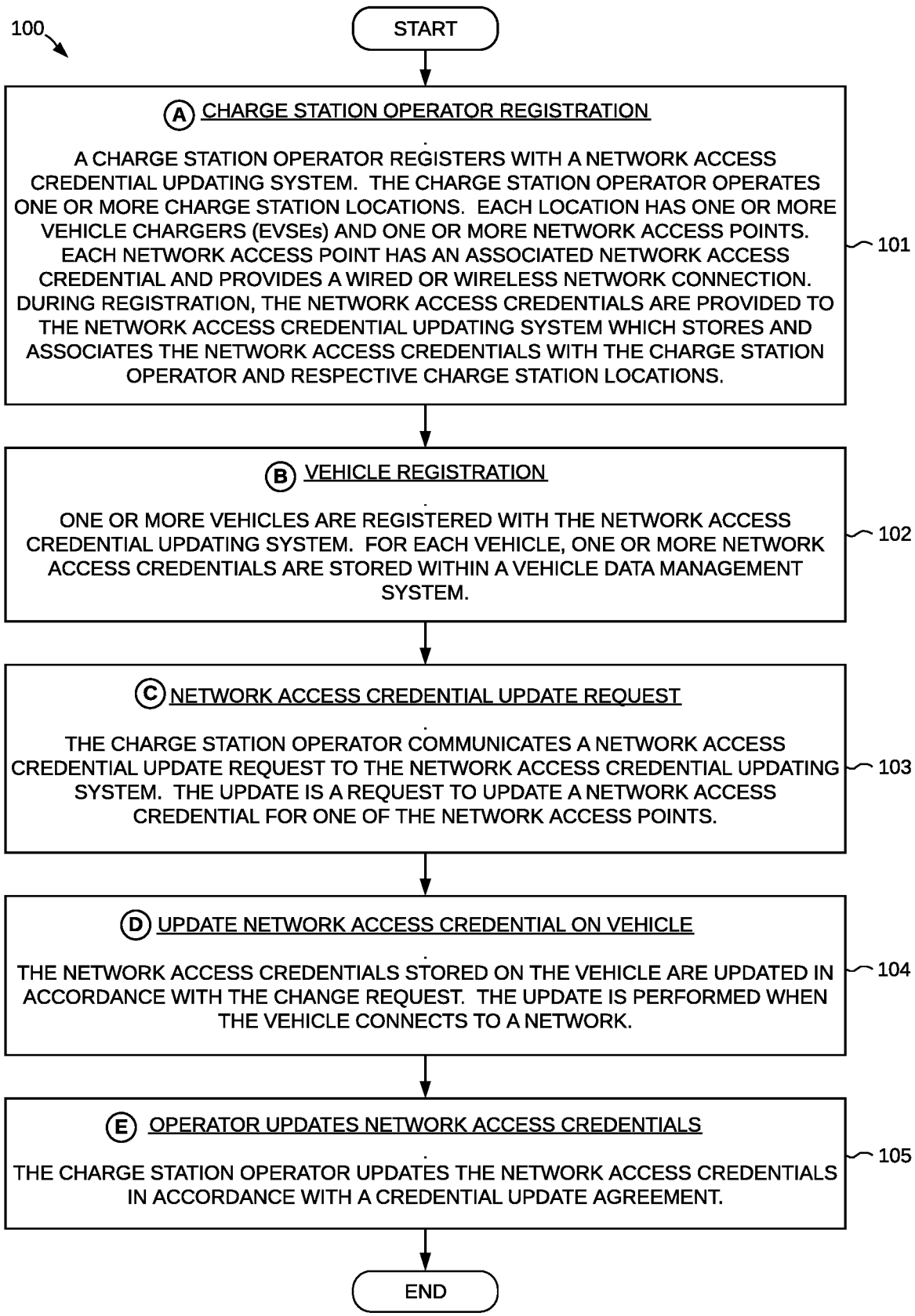
FIG. 2 is a flowchart of a method 100 in accordance with at least one novel aspect.

FIG. 2 is a flowchart of a method 100 in accordance with at least one novel aspect. In a first step (step 101), a charge station operator registers with a network access credential updating system. The charge station operator operates one or more charge station locations. Each location has one or more vehicle chargers (EVSEs) and one or more network access points. Each network access point has an associated network identifier and access credential and provides a wired or wireless network connection. During registration, the network identifiers and access credentials are provided to the network access credential updating system which stores and associates the network identifiers and access credentials with the charge station operator and respective charge station locations.

In a second step (step 102), one or more vehicles are registered with the network access credential updating system. For each vehicle, one or more network identifiers and access credentials are stored within a vehicle data management system. In one embodiment, this step is part of the provisioning process during vehicle manufacturing.

In a third step (step 103), the charge station operator communicates a network access credential update request to the network access credential updating system. The update is a request to update a network access credential for one of the network access points.

In a fourth step (step 104), the network access credentials stored on the vehicle are updated in accordance with the change request. The update is performed when the vehicle connects to the network or when a technician physically accesses the vehicle. The connection to the network may be provided by the network access point which is having its network access credential updated or the connection may be provided by a different means of network access. In one embodiment, the network may be accessed by a cellular data connection.

In a fifth step (step 105), the charge station operator updates the network access credentials in accordance with a credential update agreement. In one embodiment, step 105 might occur before step 104, in which case vehicles are updated over a separate network or separate network connection, such as a cellular network connection, or are manually updated by technician. For example, if a network access point is compromised and the charge station operating entity has to immediately alter network access credentials, then the vehicles must be updated manually or via a separate network connection.

Figure 3:
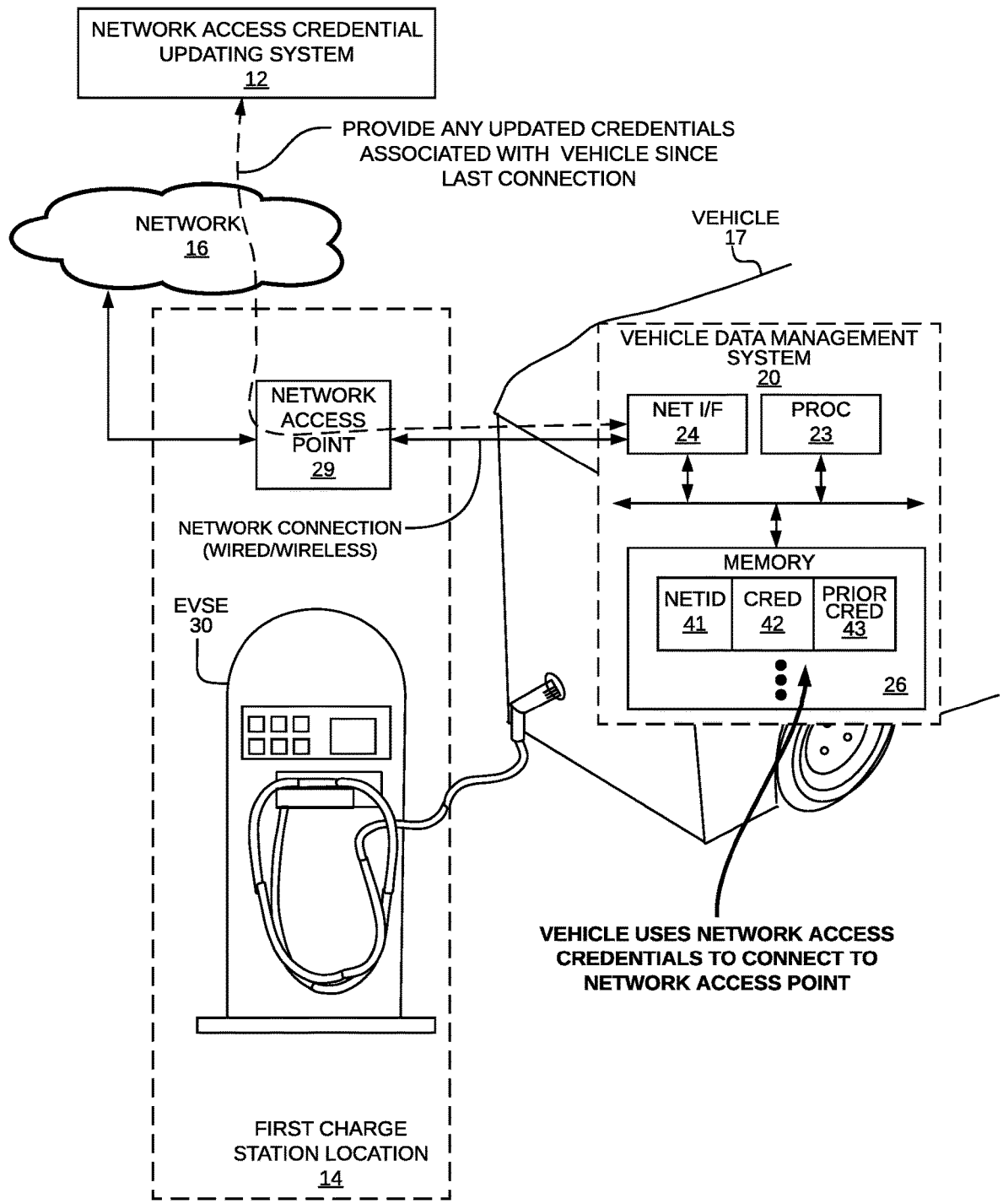
FIG. 3 is a diagram showing how the vehicle 17 connects to charging station 30 and receives any updated network access credentials from the network access credential updating system 12.

FIG. 3 is a diagram showing how the vehicle 17 connects to charging station 30 (also known as electric vehicle supply equipment or EVSE) and receives any updated network access credentials from the network access credential updating system 12. The charging station 30 includes a cable and plug. The cable forms a protective enclosure around AC supply conductors, ground conductors, and additional signal conductors (not shown). To initiate charging, the plug is inserted into a socket of electric vehicle 17. In one embodiment, the vehicle 17 may connect to the network access credential updating system 12 as the vehicle 17 nears the charging station 30 but before coming to a stop or before the plug is inserted.

Vehicle 17 accesses network 16 via the network access point 29. The vehicle data management system 20 stores network access credentials to connect to various network access points across various charge station locations. The memory 26 stores network identification information 41, network access credentials 42, and prior network access credentials 43. In one embodiment, the credentials are securely stored in memory 26 using encryption. The vehicle data management system 20 stores prior network access credentials 43 in the event that the charge station operating entity 13 has not yet updated the network access point with the latest credentials. In this example, processor 23 identifies accessible network access points in the surrounding area, for example using network identifiers or names, such as service set identifiers (SSIDs). Processor 23 uses the identified SSIDs to perform a lookup operation in the memory 26 and identify matching networking identification information 41. Once a match is found, the processor attempts to connect with the corresponding network access credential 42 for the particular network 41. If the network access credential 42 grants access, the prior network access credential 43 may be deleted. If the network access credential 42 fails to grant access, then the processor 23 attempts to connect using the prior network access credential 43.

After the vehicle data management system 20 is connected to the network access point 29, the vehicle data management system 20 connects to network access credential updating system 12 via network 16. The network access credential updating system 12 stores timestamps indicating the last credential update requested by the charge station operating entity 13. The network access credential updating system 12 provides the vehicle data management system 20 with any updated network access credentials associated with the vehicle 17 since last connecting to the network access credential updating system 12.

The vehicle data management system 20 receives any updated network access credentials for network access point 29 and 33, or other network access points, and stores them in memory 26. When storing a new network access credential, the most recent network access credential overwrites the prior network access credential stored in field 43, and the new network access credential is stored in field 42. The memory 26 operates as a first-in, first-out buffer always storing the latest updated network access credential and at least one prior network access credential. In other embodiments, records of network access credentials are stored and maintained by the vehicle data management system 20.

Figure 4:
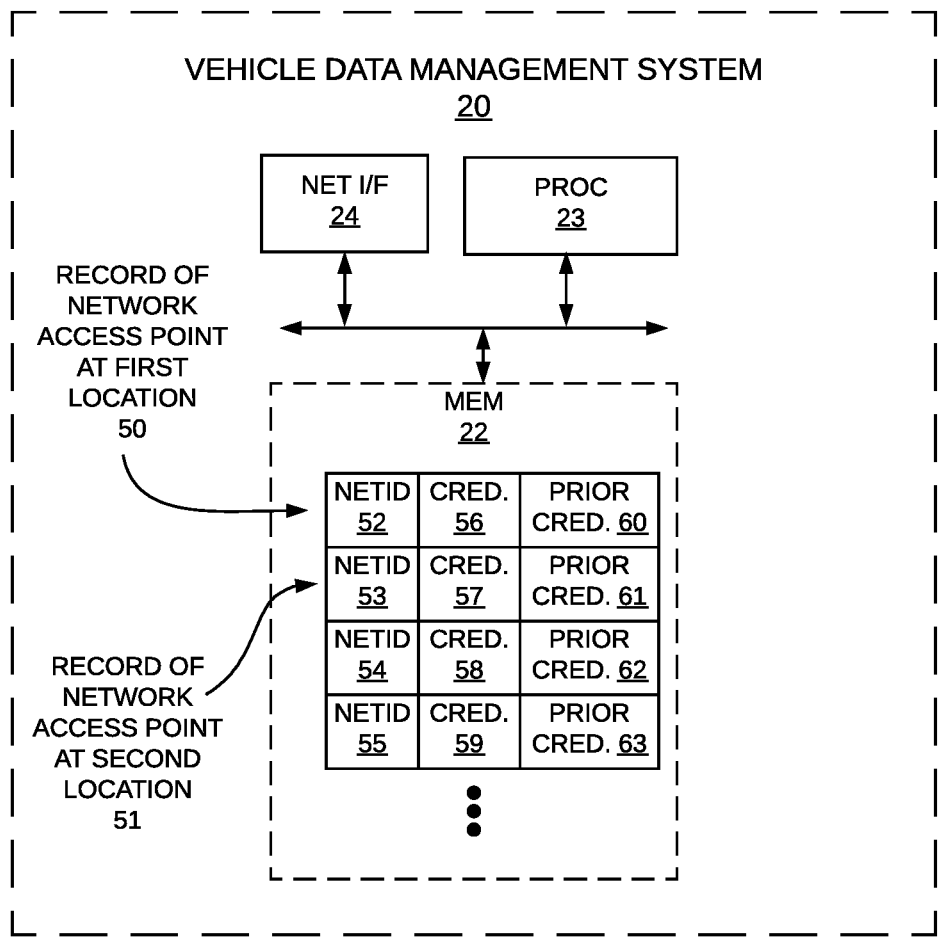
FIG. 4 is a detailed diagram of the vehicle data management system 20.

FIG. 4 is a detailed diagram of the vehicle data management system 20. The vehicle data management system includes the network interface 24, the processor 23, and the memory 22. The memory 22 stores network access credential records for each network access point across various charge station locations. Memory 22 stores a table of network identifiers including fields 52-55, network access credentials including fields 56-59, and prior network access credentials including fields 60-63. Reference numeral 50 identifies network access credential information records at the first location 14. Reference numeral 51 identifies network access credential information records at the second location 15. A charge station operating entity may use the same network identifier, such as an SSID, and the same network access credentials, such as a password, for different network access points at various locations. In one embodiment, network access credential information records 50 are used in a third location.

Record 50 comprises network identification information 52, network access credential 56, and prior network access credential 60. Record 51 comprises network identification information 53, network access credential 57, and prior network access credential 61. When the vehicle 17 is near the first charge station location 14, then the vehicle uses network access credentials 56 and 60 for accessing network 52. When the vehicle 17 is near the second charge station location 15, then the vehicle uses network access credentials 57 and 62 for accessing network 53.

Figure 5:
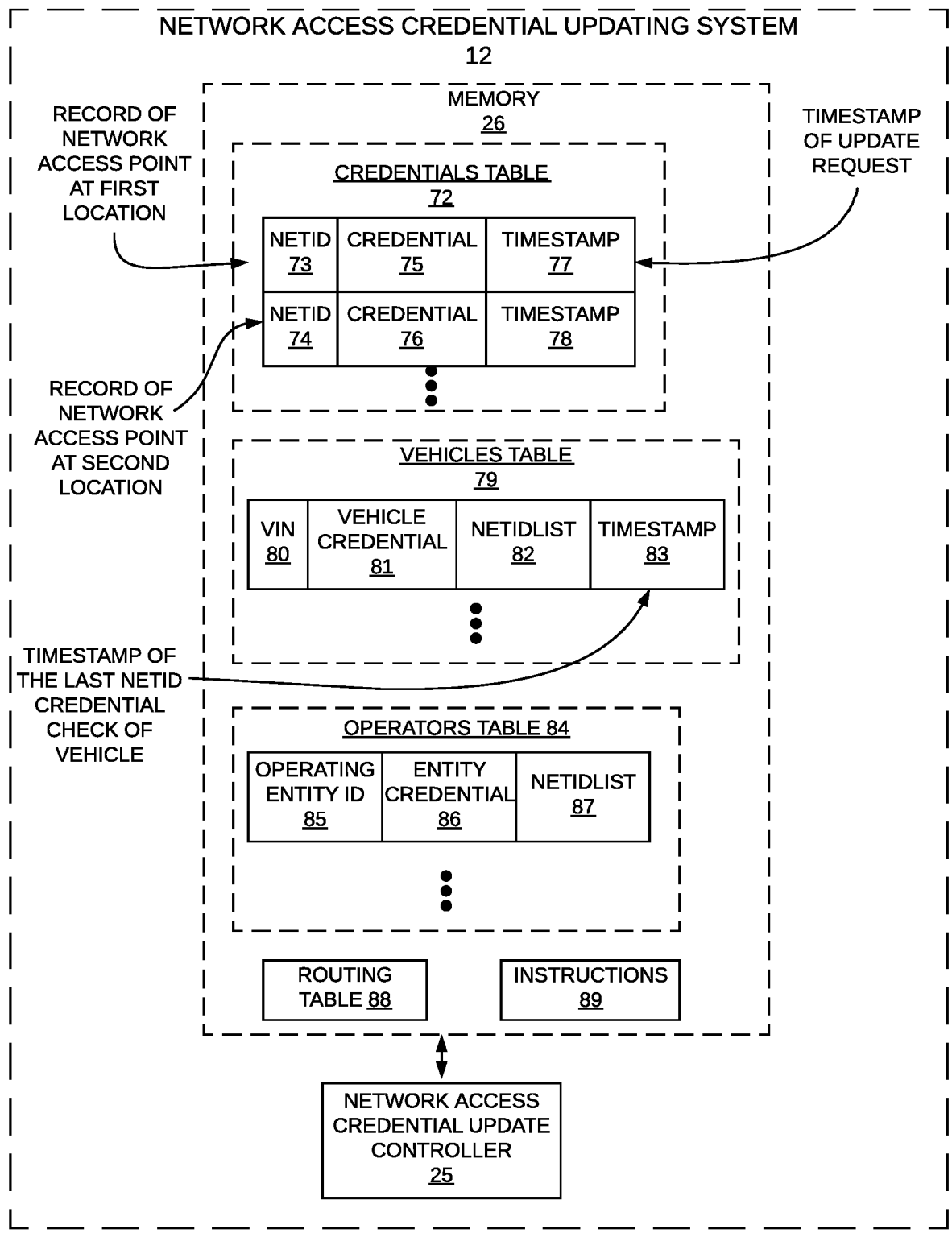
FIG. 5 is a detailed diagram of the network access credential updating system 12.

FIG. 5 is a detailed diagram of the network access credential updating system 12. The network access credential updating system comprises the memory 26, and network access credential update controller 25.

The memory 26 includes a network access credential information table 72, a vehicle information table 79, and a charge station operator information table 84, a routing table 88, and an amount of computer readable instructions 89.

The network access credential information table 72 comprises both the network information of the network access point at the first location and the network access point at the second location. The network information of the network access point at the first location includes a network identifier 73, a network access credential 75, and a timestamp 77. The network information of the network access point at the second location includes a network identifier 74, a credential 76, and a timestamp 78.

The vehicle information table 79 includes vehicle identification number information 80, a vehicle credential 81, a network identifier list 82, and a timestamp 83. The vehicle credential information 81 is used to authenticate a vehicle connecting to the network access credential updating system 12.

The charge station operator information table 84 includes an operating entity identification, an entity credential information 86, and a network identifier list 87. The entity credential information 86 is used to authenticate an entity connecting to the network access credential updating system 12.

Figure 6:
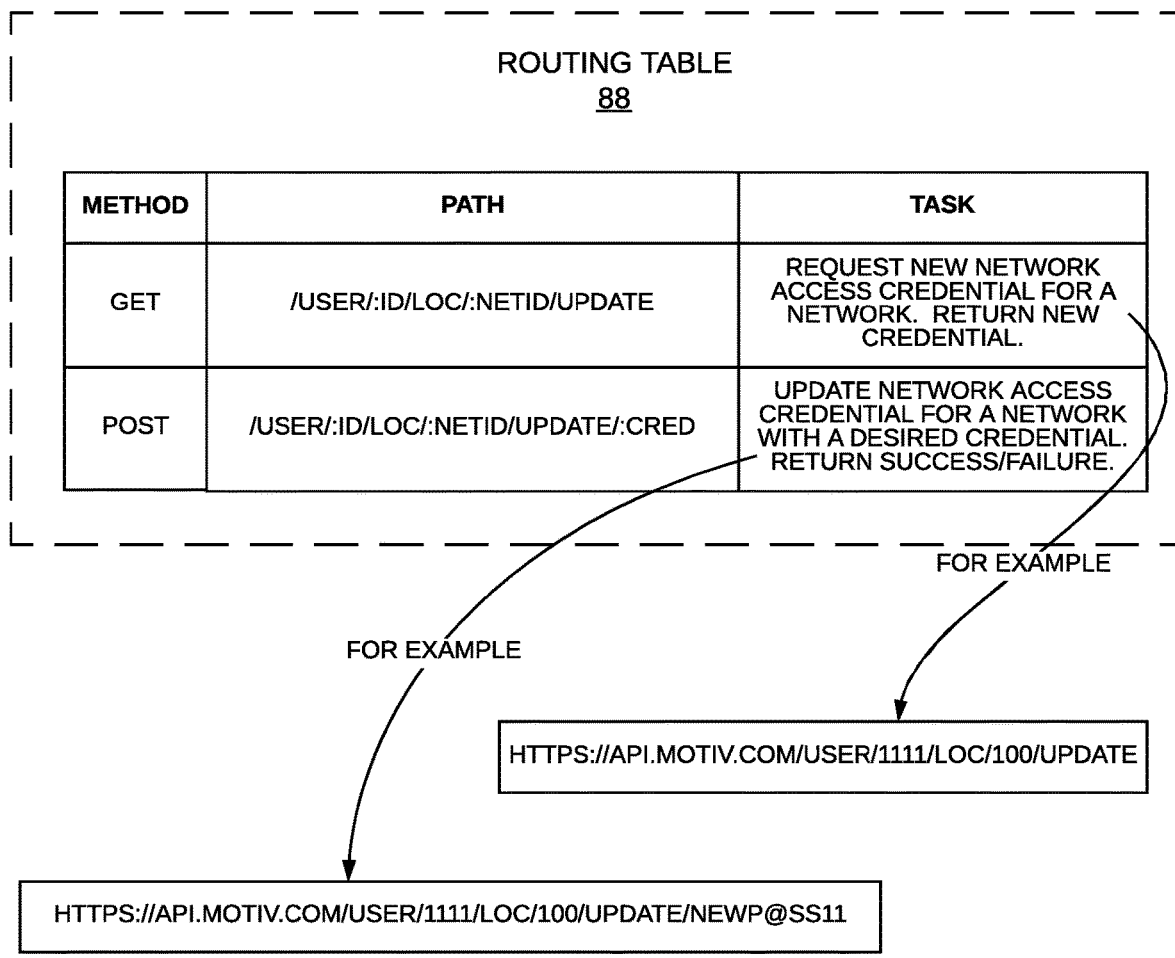
FIG. 6 is a detailed diagram of the routing table 88 stored in the memory 26 of the network access credential updating system 12.

FIG. 6 is a detailed diagram of the routing table 88 stored in the memory 26 of the network access credential updating system 12. The routing table 88 sets forth various endpoints established by instructions 89. In this example, when executed by a processor, instructions 89 realize a software application that provides a Representational state transfer (REST) application programming interface (API) service. Unlike conventional techniques, the software application does not employ Wi-Fi Protected Access (WPA) Enterprise security standards or techniques. It is understood that other software implementations may be used to provide the functionality provided by the network access credential updating system 12.

In this example, GET request and POST request endpoints are shown. The GET request allows the charge station operating entity 13 to request a new network access credential for a specified network access point. The POST request allows the charge station operating entity 13 to set a new network access credential for a specified network access point. In some examples, two or more network access points will use the same network identifier (SSID) and network access credential (password).

Figure 7:
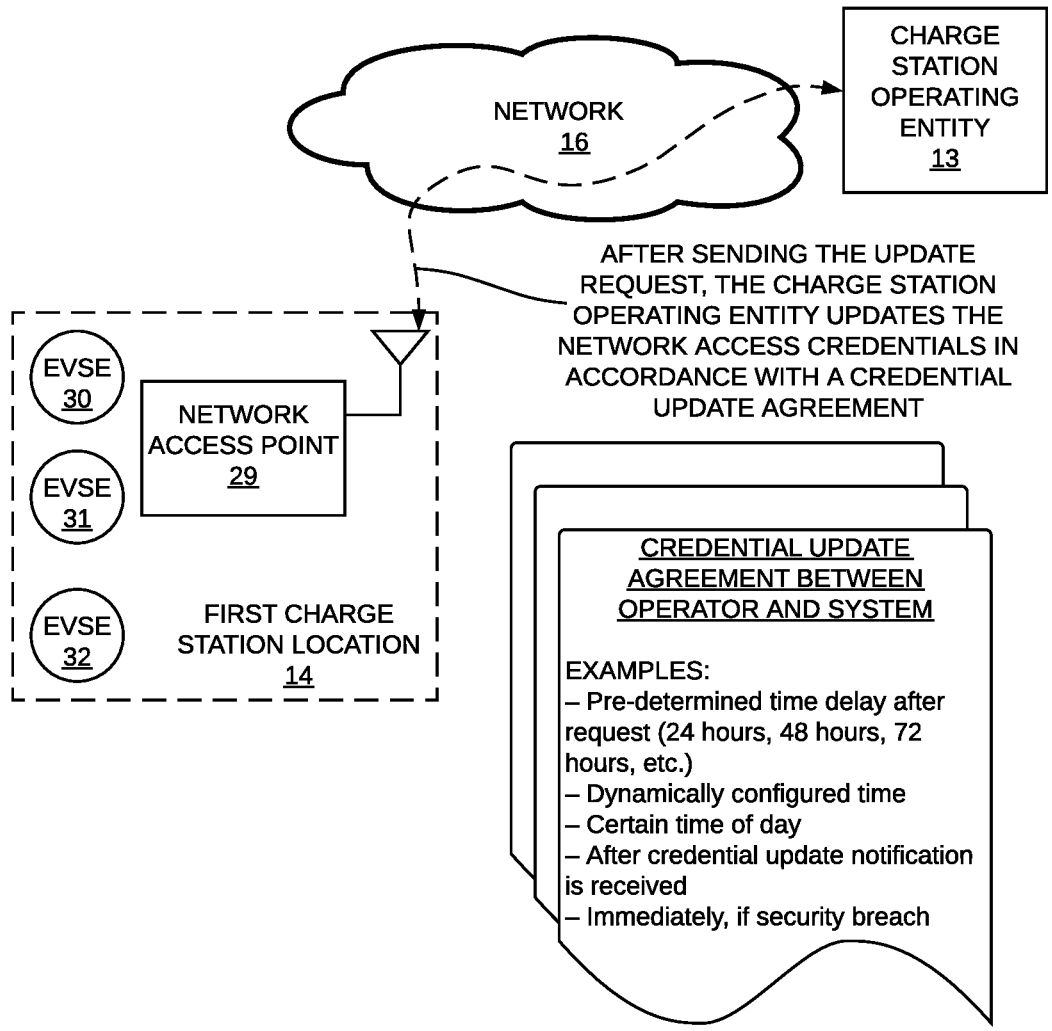
FIG. 7 is a diagram showing how network access credentials are updated by the charge station operating entity 13 in accordance with a credential update agreement.

FIG. 7 is a diagram showing how network access credentials are updated by the charge station operating entity 13 in accordance with a credential update agreement. The credential update agreement is an understanding between the charge station operating entity 13 and the network access credential updating system 12. After sending the update request, the charge station operating entity updates the network access credentials in accordance with a credential update agreement.

In one embodiment, the credential update agreement involves a predetermined time delay after the network access credential request is made. For example, the charge station operating entity agrees to wait for a pre-agreed duration of time (24 hours, 48 hours, 72 hours, etc.) after the network access credentials update request is made before updating the network access credentials. In another embodiment, the charge station operating entity agrees to wait for a pre-agreed duration of time, which is dynamically configurable, after the network access credentials update request is made before updating the network access credentials. In yet another embodiment, the charge station operating entity agrees to update the network access credentials on a certain time of day after submitting the network access credentials update request. For example, the charge station operating entity agrees to only update the network access credentials on Sundays at noon with at least 48 hours between the network access credentials update request and the subsequent Sunday noon time update time. In yet another embodiment, the charge station operating entity agrees to only update the network access credentials after a credential update notification is received from the updating system. In yet another embodiment, the charge station operating entity agrees to update the network access credentials immediately, if, for example, unauthorized users breach the network access point. In this case, vehicles in the fleet are updated using a separate network connection or using a separate network, such a cellular network, or manually updated by a technician.

Figure 8:
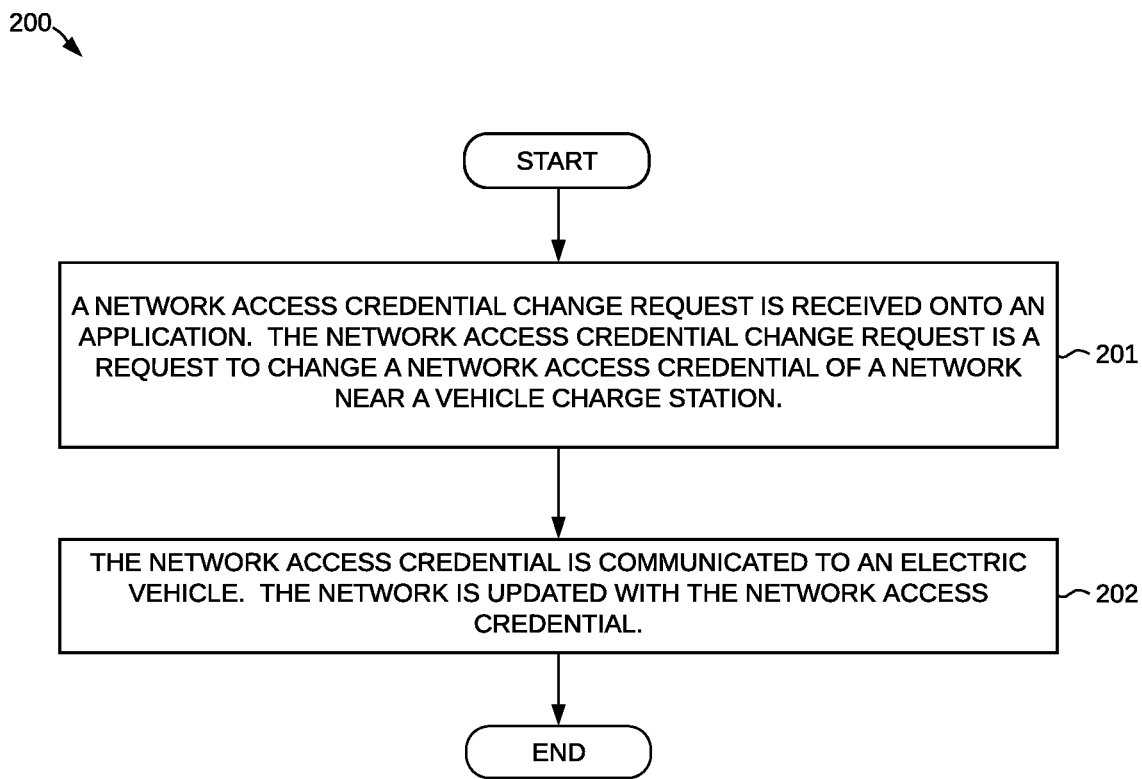
FIG. 8 is a flowchart of a method 200 in accordance with another novel aspect.

FIG. 8 is a flowchart of a method 200 in accordance with another novel aspect. In a first step (step 201), a network access credential change request is received onto an application. The network access credential change request is a request to change a network access credential of a network accessed near a vehicle charge station.

In a second step (step 202), the network access credential is communicated to an electric vehicle. The network access point is updated with the network access credential.

Figure 9:
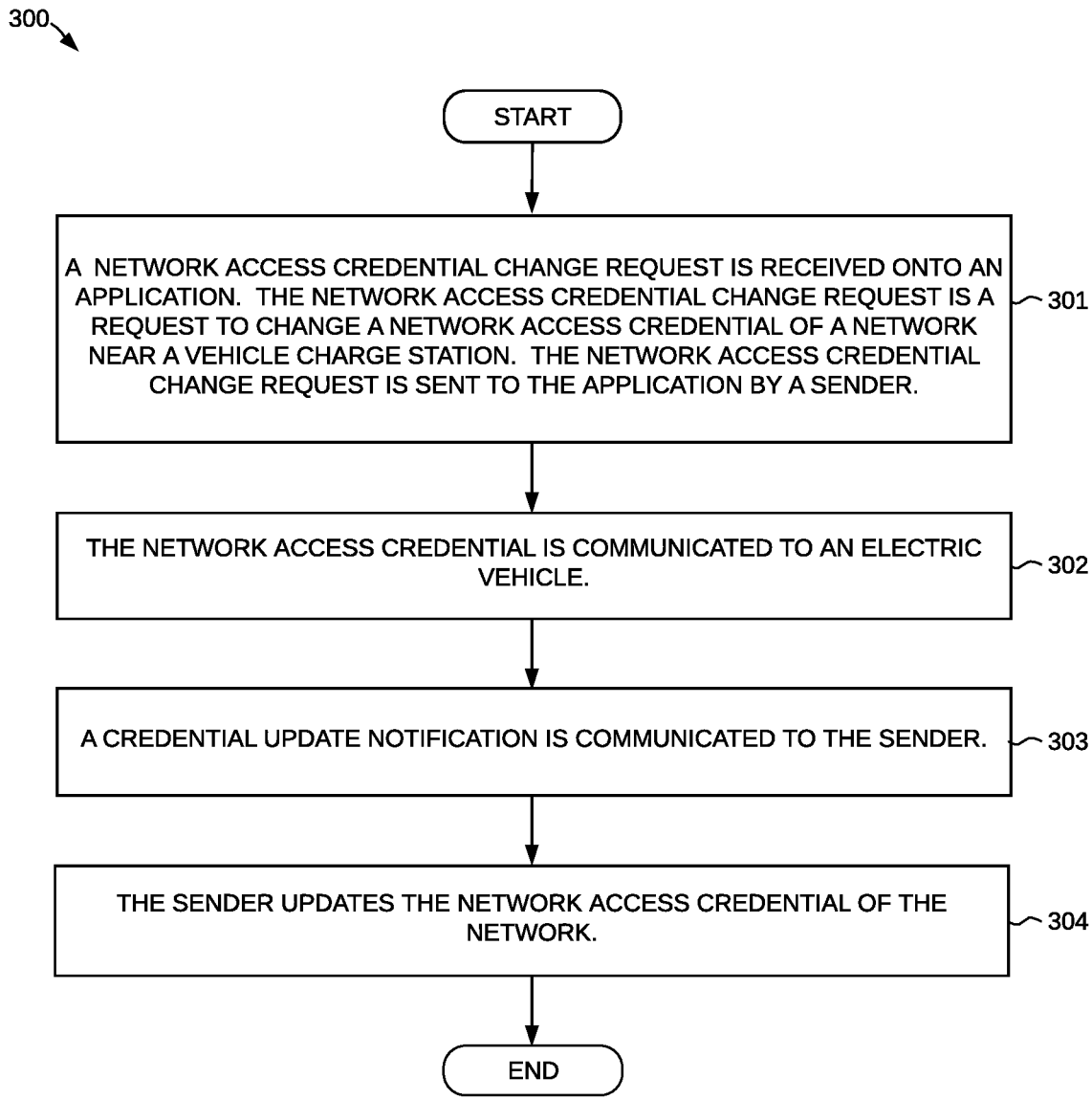
FIG. 9 is a flowchart of a method 300 in accordance with another novel aspect.

FIG. 9 is a flowchart of a method 300 in accordance with another novel aspect. In a first step (step 301), a network access credential change request is received onto an application. The network access credential change request is a request to change a network access credential of a network near a vehicle charge station. The network access credential change request is sent to the application by a sender.

In a second step (step 302), the network access credential is communicated to an electric vehicle.

In a third step (step 303), a credential update notification is communicated to the sender.

In a fourth step (step 304), the sender updates the network access credential of the network.

Figure 10:
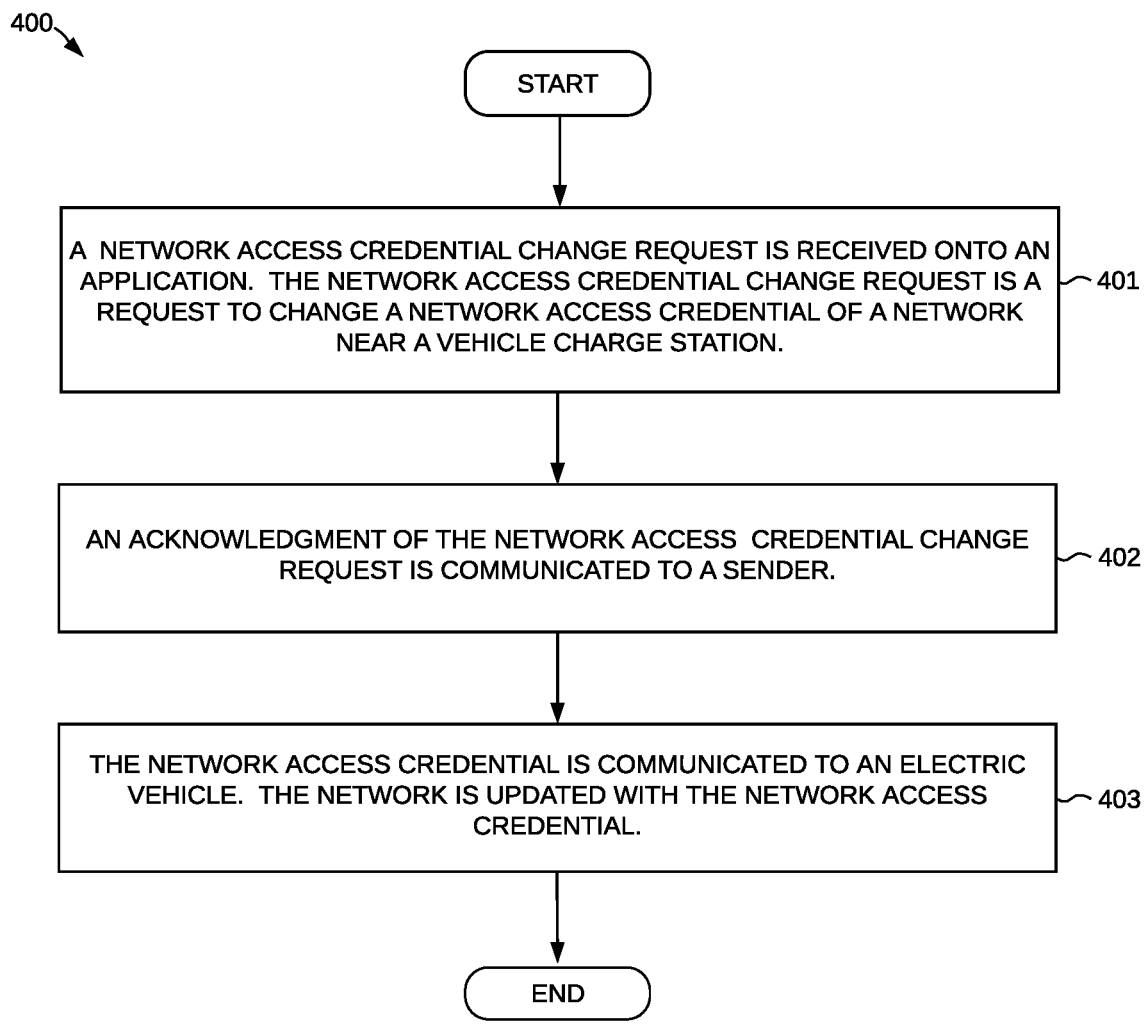
FIG. 10 is a flowchart of a method 400 in accordance with another novel aspect.

FIG. 10 is a flowchart of method 400 in accordance with another novel aspect. In a first step, (step 401), a network access credential change request is received onto an application. The network access credential change request is a request to change a network access credential of a network near a vehicle charge station.

In a second step (step 402), an acknowledgment of the network access credential change request is communicated to a sender.

In a third step (step 403), the network access credential is communicated to an electric vehicle. The network is updated with the network access credential.

Figure 11:
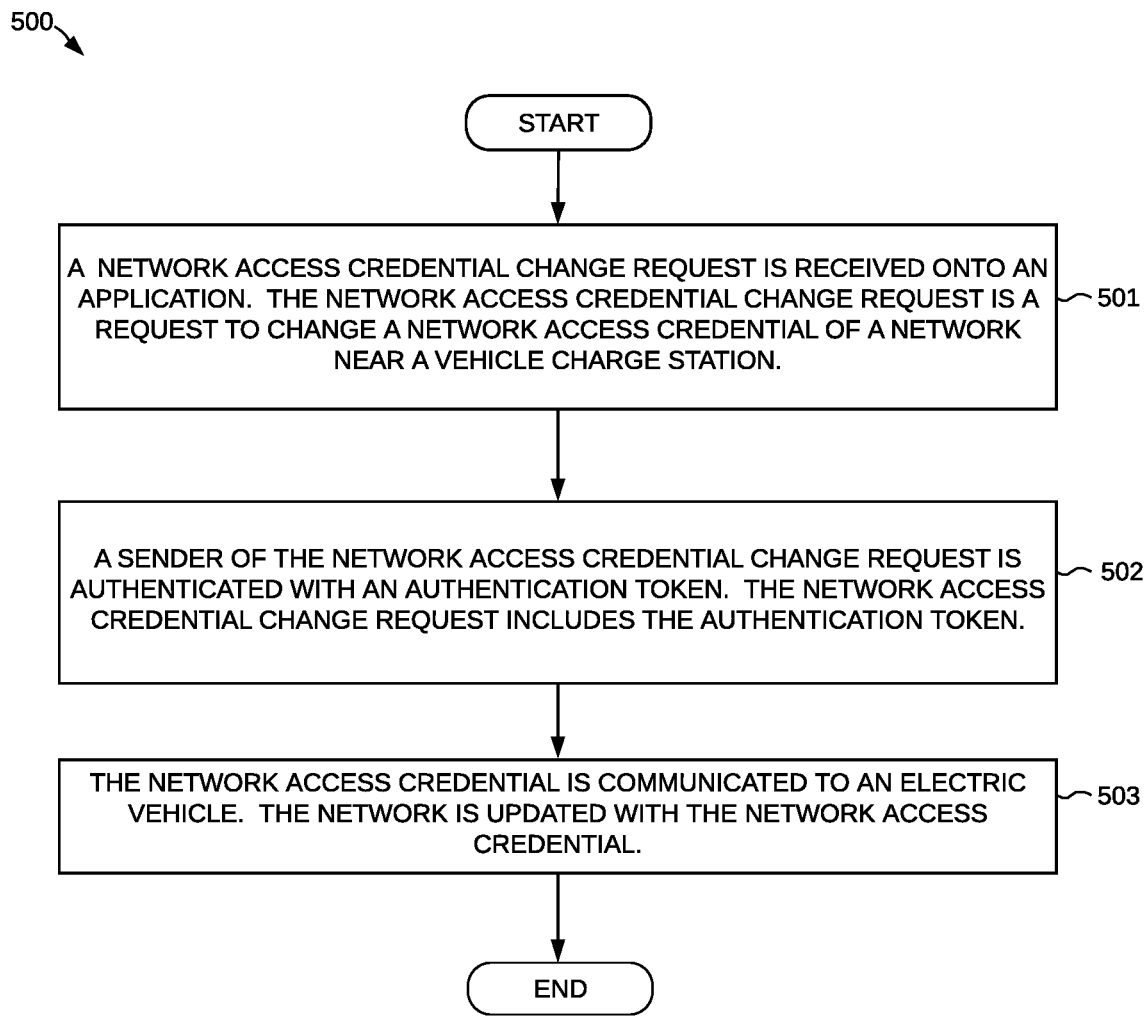
FIG. 11 is a flowchart of method 500 in accordance with another novel aspect.

FIG. 11 is a flowchart of method 500 in accordance with another novel aspect. In a first step, (step 501), a network access credential change request is received onto an application. The network access credential change request is a request to change a network access credential of a network near a vehicle charge station.

In a second step (step 502), the sender is authenticated to the application with a token. The network access credential change request includes a token. The authentication confirms the token is associated with the sender.

In a third step (step 503), the network access credential is communicated to an electric vehicle. The network is updated with the network access credential.

Figure 12:
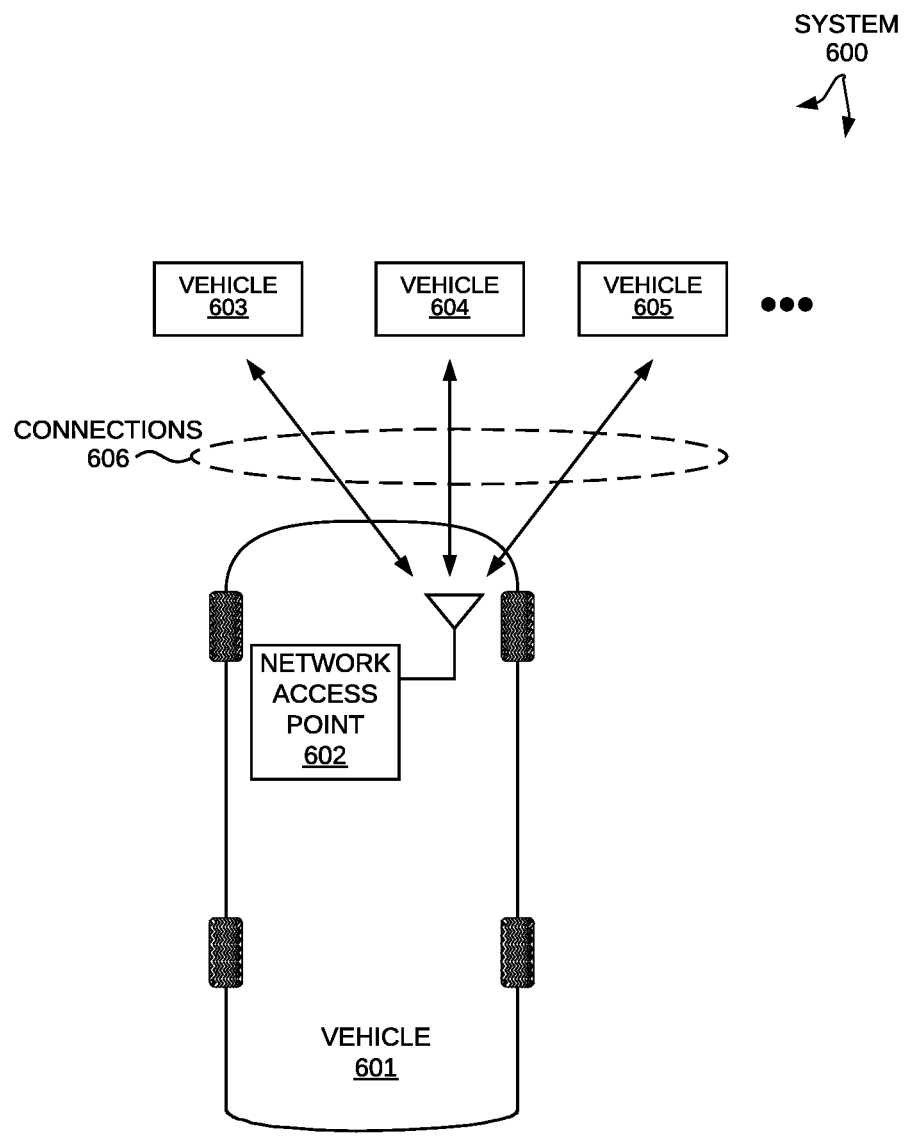
FIG. 12 is a diagram of a system 600 that includes a vehicle 601 having a network access point 602.

FIG. 12 is a diagram of a system 600 that includes a vehicle 601 having a network access point 602. In this example, the network access point 602 operates as a "hotspot" that provides network access to other devices, such as vehicles 603, 604, and 605. Secure connections 606 with network access point 602 are established using network access credentials that are updated and exchanged using any of the above disclosed techniques.

Figure 13:
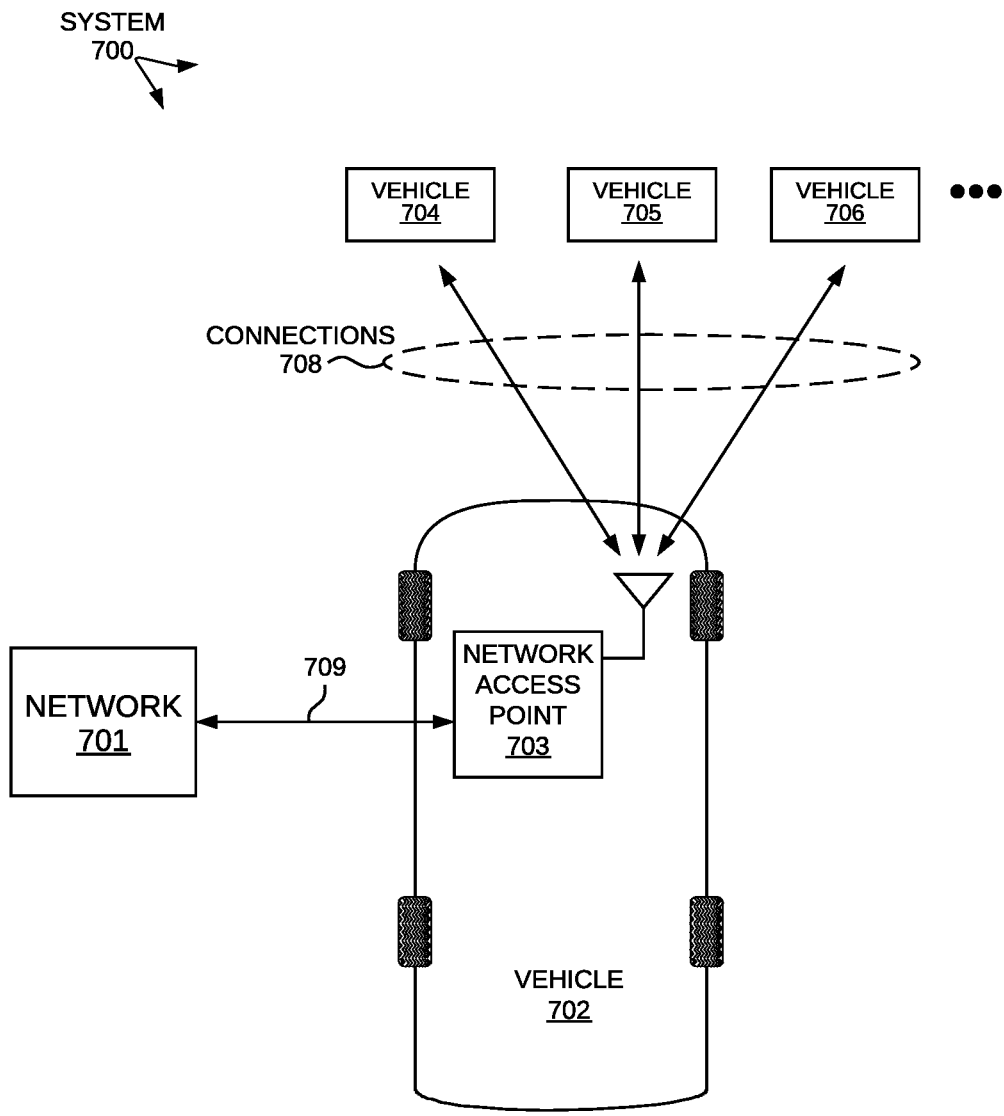
FIG. 13 is a diagram of a system 700 having a network 701 and a vehicle 702 that provides a gateway to network 701.

FIG. 13 is a diagram of a system 700 having a network 701 and a vehicle 702 that provides a gateway to network 701. Vehicle 702 includes a network access point 703 that provides network access to other devices, such as vehicles 704, 705, and 706. Secure connections 708 with network access point 703 are established using network access credentials that are updated and exchanged using any of the above disclosed techniques. The network access point 703 connects to the network 701 via secure connection 709. The network access point 703 provides a gateway for other vehicles 704, 705, and 706 to access the network 701.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   receiving a network access credential change request from a first entity onto an application, wherein the network access credential change request is a request to change a network access credential of a network near a vehicle charge station, and wherein the first entity manages the vehicle charge station, and wherein a second entity manages the application; and
   communicating a changed network access credential to an electric vehicle, wherein the network is updated with the changed network access credential after a pre-agreed duration of time that is agreed upon between the first entity and the second entity and is dynamically configurable, and wherein the first entity waits for the pre-agreed duration of time after the network access credential change request is made before updating the network access credentials.

2. The method of claim 1, wherein the network access credential is a pre-shared key.

3. The method of claim 1, wherein the network access credential is communicated to the vehicle over a secure channel that was secured using a prior network access credential.

4. The method of claim 3, wherein the secure channel is provided over a cellular network, a wireless network, or through a wired network connection.

5. The method of claim 1, wherein the first entity updates the network with the network access credential in accordance with a credential update agreement that indicates the pre-agreed duration of time.

6. The method of claim 1, further comprising:
   communicating a credential update notification to the first entity after which the first entity updates the network access credential of the network.

7. The method of claim 1, further comprising:
   communicating an acknowledgment of the network access credential change request to the first entity.

8. The method of claim 1, wherein the application is a Representational state transfer (REST) application programming interface (API) service, and wherein the application does not use Extensible Authentication Protocol (EAP) or another standard authentication protocol to update network access credentials on the vehicle.

9. The method of claim 1, wherein only authorized senders can submit network access credential change requests to the application.

10. The method of claim 1, wherein the pre-agreed duration of time is at least twenty-four (24) hours.

11. The method of claim 1, wherein the electric vehicle includes a vehicle data management system that stores the network access credentials.

12. The method of claim 1, wherein the receiving and the communicating occur over secure communication channels.

13. The method of claim 1, further comprising:
   authenticating a sender of the network access credential change request with an authentication token, wherein the network access credential change request includes the authentication token.

14. The method of claim 1, wherein the first entity manages the network, and wherein the second entity that communicates the network access credential to the vehicle.

15. The method of claim 1, wherein the communicating also involves communicating the network access credential to other vehicles of a fleet.

16. The method of claim 1, wherein the first entity waiting the pre-agreed duration of time involves at least one of: the first entity waiting a pre-determined time period after the network access credential change request is made, the first entity waiting a time period provided by the second entity after the network access credential change request is made, the first entity waiting until a certain time of day after the network access credential change request is made, and the first entity waiting until a notification is received from the second entity.

17. A system comprising:
   a memory that stores network access credentials; and
   a network access credential update controller, wherein in response to receiving a network access credential change request from a charge station operator, the network access credential update controller communicates a changed network access credential to an electric vehicle, wherein the network access credential change request is a request to change a network access credential of a network near a vehicle charge station, wherein a system operator manages the network access credential update controller, wherein the network is updated with the changed network access credential after a pre-agreed duration of time that is agreed upon between the charge station operator and the system operator and is dynamically configurable, and wherein the charge station operator waits for the pre-agreed duration of time after the network access credential change request is made before updating the network access credentials.

18. The system of claim 17, wherein the network access credential update controller stores the network access credential provided by charge station operator in memory.

19. The system of claim 17, wherein the charge station operator waiting the pre-agreed duration of time involves at least one of: the charge station operator waiting a pre-determined time period after the network access credential change request is made, the charge station operator waiting a time period provided by the system operator after the network access credential change request is made, the charge station operator waiting until a certain time of day after the network access credential change request is made, and the charge station operator waiting until a notification is received from the system operator.

\* \* \* \* \*